(12) United States Patent
Minato et al.

(10) Patent No.: US 9,312,036 B2
(45) Date of Patent: Apr. 12, 2016

(54) JET PUMP MEASUREMENT PIPE REPAIR METHOD

(75) Inventors: Yuki Minato, Tokyo (JP); Toshihiro Yasuda, Kanagawa (JP); Kunihiko Kinugasa, Kanagawa (JP); Hajime Mori, Kanagawa (JP); Satoshi Yamamoto, Saitama (JP); Jun Suzuki, Kanagawa (JP); Tadahiro Mitsuhashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 934 days.

(21) Appl. No.: 13/315,887

(22) Filed: Dec. 9, 2011

(65) Prior Publication Data
US 2012/0144641 A1    Jun. 14, 2012

(30) Foreign Application Priority Data
Dec. 10, 2010    (JP) .................................. 2010-276188

(51) Int. Cl.
| G21C 15/25 | (2006.01) |
| G21C 17/017 | (2006.01) |
| F04F 5/54 | (2006.01) |
| G21C 19/14 | (2006.01) |
| G21C 17/10 | (2006.01) |

(52) U.S. Cl.
CPC . *G21C 15/25* (2013.01); *F04F 5/54* (2013.01); *G21C 17/017* (2013.01); *G21C 19/14* (2013.01); *G21C 17/10* (2013.01); *Y02E 30/40* (2013.01); *Y10T 29/49735* (2015.01)

(58) Field of Classification Search
CPC ........ B23P 6/00; G21C 15/25; G21C 17/017; G21C 17/10; G21C 19/04; F16L 1/26; F16L 55/16; F16L 55/18; F16L 55/1608; F16L 55/168; F16L 55/1683

USPC ............... 29/402.01, 402.03, 402.04, 402.06, 29/402.07, 402.08, 402.09, 402.11, 29/402.12, 402.14, 407.01, 407.05; 376/260

See application file for complete search history.

(56) References Cited

U.S. PATENT DOCUMENTS 2,011,433 A * 8/1935 Blagg et al. .................... 285/329
5,796,797 A * 8/1998 Fallas ............................. 376/260

(Continued)

FOREIGN PATENT DOCUMENTS

| JP | 62-153796 | 7/1987 |
| JP | 4-9696 | 1/1992 |

(Continued)

OTHER PUBLICATIONS

Mahcine Translation of JP 2004-209515 A to Toshiba Corp.*

(Continued)

*Primary Examiner* — Christopher M Koehler
(74) *Attorney, Agent, or Firm* — Oblon, McClelland, Maier & Neustadt, L.L.P.

(57) ABSTRACT

In a jet pump measurement pipe repair method according to the present embodiment, a breakage part of a measurement pipe horizontally fixed to a lower part of a jet pump provided in reactor water in a reactor pressure vessel is repaired. The method has: a step of cutting and removing the measurement pipe including the breakage part; a step of retaining a connection pipe for connecting the remaining measurement pipe on the jet pump by means of a clamp; and a step of connecting ends of the remaining measurement pipe by means of the connection pipe.

4 Claims, 13 Drawing Sheets

(56) References Cited

U.S. PATENT DOCUMENTS

| | | | |
|---|---|---|---|
| 6,195,892 B1* | 3/2001 | Weems et al. | 29/890.031 |
| 6,233,301 B1* | 5/2001 | Robergeau | 376/302 |
| 6,264,203 B1* | 7/2001 | Weems et al. | 277/314 |
| 6,834,092 B2* | 12/2004 | Willis et al. | 376/260 |
| 7,578,191 B2* | 8/2009 | Kasik et al. | 73/590 |
| 2002/0064250 A1 | 5/2002 | Kurosawa et al. | |
| 2005/0135904 A1* | 6/2005 | Wivagg et al. | 414/222.01 |
| 2008/0247498 A1* | 10/2008 | Nopwaskey et al. | 376/214 |
| 2013/0195238 A1* | 8/2013 | Ohmori et al. | 376/260 |
| 2014/0098921 A1* | 4/2014 | Nopwaskey et al. | 376/214 |

FOREIGN PATENT DOCUMENTS

| | | |
|---|---|---|
| JP | 2002-168992 | 6/2002 |
| JP | 2004-209515 | 7/2004 |
| JP | 2008-261854 | 10/2008 |
| JP | 4298527 | 4/2009 |
| TW | 529035 | 4/2003 |

OTHER PUBLICATIONS

Taiwanese Office Action issued Apr. 3, 2014, in Taiwan patent Application No. 100145314 (with English Translation of Category of Cited Documents).

Japanese Office Action issued Apr. 30, 2014, in Japan Patent Application No. 2010-276188.

The Extended European Search Report issued May 13, 2014, in Application No. / Patent No. 11192764.6-1556 / 2463527.

* cited by examiner

JET PUMP MEASUREMENT PIPE REPAIR METHOD

CROSS REFERENCE TO RELATED APPLICATION

This application is based upon and claims the benefit of priority from Japanese Patent Application No. 2010-276188, filed on Dec. 10, 2010, the entire content of which is incorporated herein by reference.

FIELD

Embodiments described herein relate generally to a jet pump measurement pipe repair method for repairing a measurement pipe provided in a diffuser of a jet pump in a boiling water reactor.

BACKGROUND

A conventional boiling water reactor adopts a so-called jet pump system obtained by combining recirculation pumps installed outside a reactor pressure vessel and jet pumps installed inside the reactor pressure vessel for the purpose of increasing power density.

Figure 13:
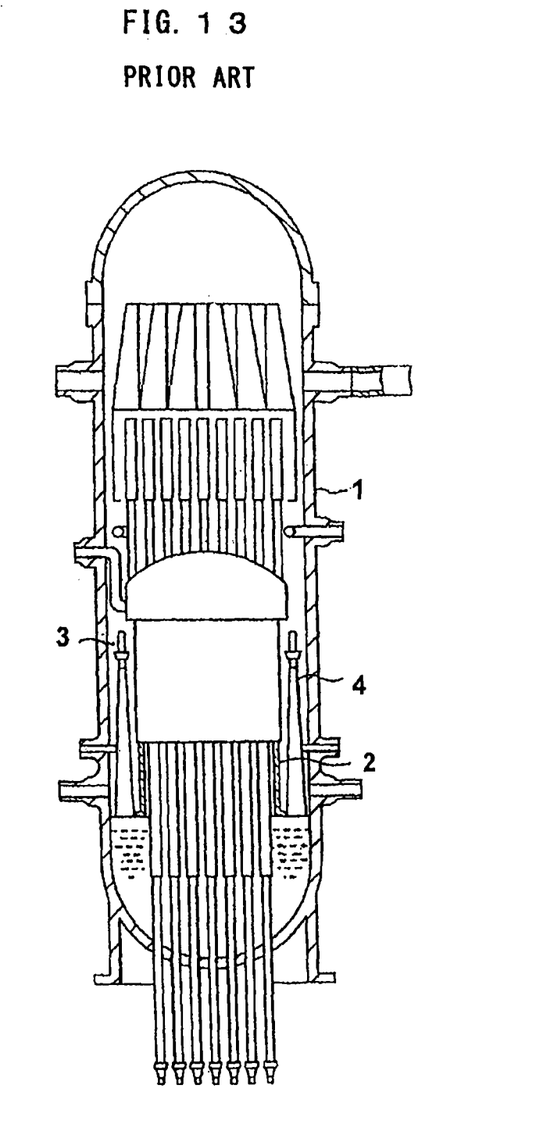
FIG. 13 is an elevated cross-sectional view schematically illustrating a configuration of a conventional boiling water reactor.
Figure 14:
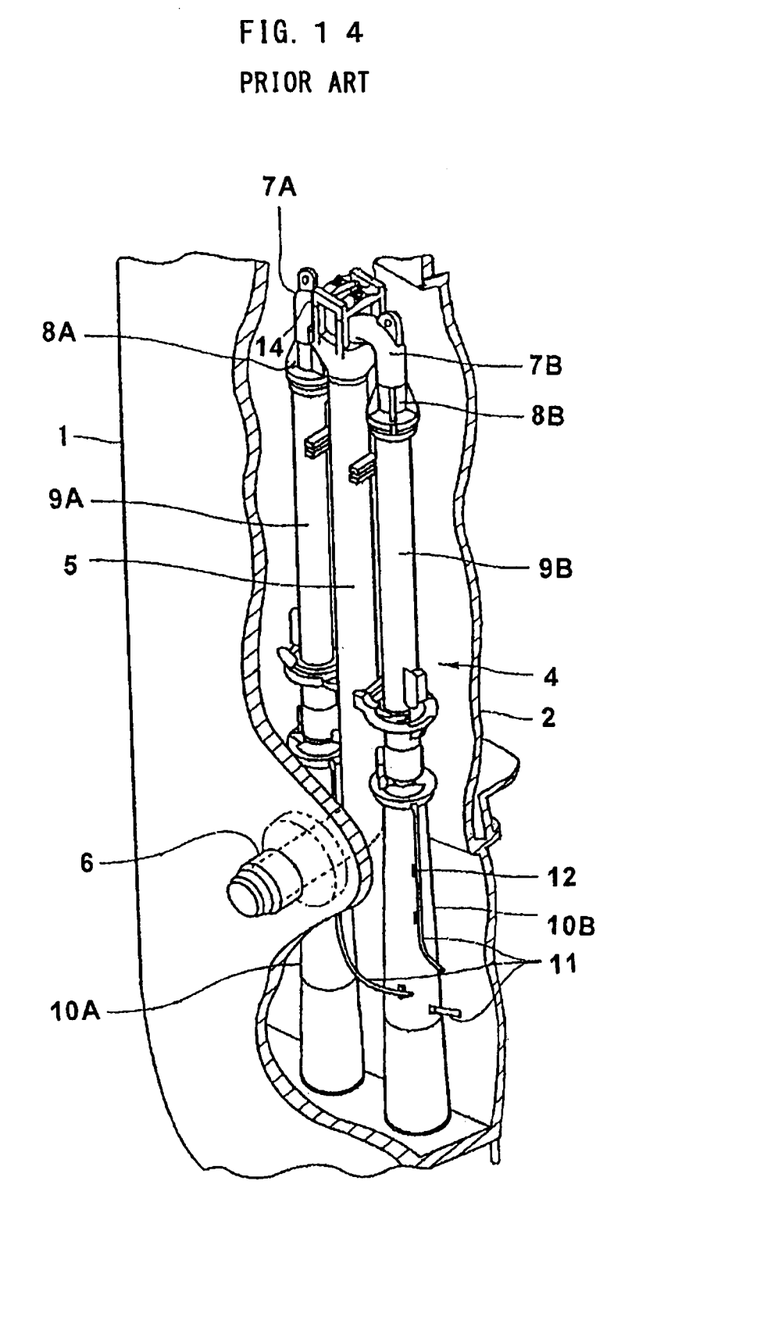
FIG. 14 is a perspective view illustrating in an enlarged manner the main part of jet pumps of FIG. 12.

As illustrated in FIG. 13, a plurality of jet pumps 4 are arranged at equal intervals in the circumferential direction between a rector pressure vessel 1 and a shroud 2 which are vertically installed in a downcomer part 3. As illustrated in FIG. 14 which is an enlarged view of the main part of FIG. 13, the jet pumps 4 each have a riser pipe 5. The riser pipe 5 is fixed to the rector pressure vessel 1 and introduces coolant supplied from a recirculation inlet nozzle 6 of a recirculation pump into the reactor pressure vessel.

A pair of elbows 7A and 7B are connected respectively to the upper part of the riser pipe 5 through a transition piece 14. A pair of inlet throats 9A and 9B are connected respectively to the pair of elbows 7A and 7B through a pair of mixing nozzles 8A and 8B. Diffusers 10A and 10B are connected respectively to the pair of inlet throats 9A and 9B.

In the following description, the inlet throats 9A, 9B and diffusers 10A, 10B are collectively referred to as "inlet throat 9" and "diffuser 10" when they are not differentiated.

Measurement of the flow rate of the jet pumps 4 during normal operation is important for power control of a nuclear power plant. To this end, measurement pipes 11 are provided at the upper and lower parts of each of the diffusers 10A and 10B. The measurement pipes 11 are used to measure the difference in the static pressure between the upper and lower parts of the diffuser 10 during operation, and the obtained measurement value is calibrated with a calibration value that has previously been measured before the use of the plant, whereby the flow rate of the jet pumps 4 are calculated.

Each of the measurement pipes 11 is welded to static pressure holes formed at the upper and lower parts of the diffuser 10 and is welded to be supported by blocks 12 and a support 13 (FIG. 15) which are supporting members fixed to the diffuser 10. As illustrated in FIGS. 16A and 16B, the measurement pipes 11 are arranged in the lower part of the jet pumps 4 in a complicated manner and are connected to pipes outside the reactor through jet pump measurement nozzles 15. The jet pump measurement nozzles 15 are provided at two symmetrical positions in a horizontal cross-section of the reactor pressure vessel 1.

The jet pumps 4 having the configuration described above are exposed to more severe conditions than other equipment because of a high temperature of about 300° C. and flow of a high speed/large flow rate cooling water pumped from a not-illustrated recirculation pumps. Therefore, a large load is applied to each of the members of the jet pumps 4. Especially, the measurement pipes 11 is subject to sever stress as they are affected, either directly or through the blocks 12 and the supports 13, by the fluid vibration generated by the flow of the high speed/large flow rate cooling water of the diffuser 10 pumped from the recirculation pumps. As a result, several pipe breakages have occurred so far. Such a breakage of the measurement pipes 11 makes it impossible to measure the flow rate of the jet pumps 4, posing a problem for the power control of the reactor, so that repair work must be conducted quickly.

As illustrated in FIG. 16B, the measurement pipes 11 are arranged in a narrow annular space 16 between the reactor pressure vessel 1 and the shroud 2. The riser pipes 5, inlet throats 9, and the like are arranged above the measurement pipes 11 as illustrated in FIG. 14. The horizontally extending part (FIG. 15) of the measurement pipe 11 near the supports 13 is closest to the shroud 2, and the interval between the measurement pipe 11 and the shroud 2 at this part is as small as less than 150 mm.

Further, the intermediate body part of the shroud 2 overhangs the horizontally extending part of the measurement pipe 11. This limits much the shape and size of a repair tool for the measurement pipe 11 and a repair method applied to the measurement pipe 11, making the repair work difficult to carry out.

In addition, the site around the measurement pipes 11 are high-radiation area, so that it is very difficult for workers to access the part to be repaired. Therefore, that under present circumstance, there is no alternative way but to remotely carry out the repair work for the measurement pipes 11 from just above the reactor core underwater.

As an example of the repair method for the measurement pipe 11 having the above configuration, there are known a method using a welding machine in an environment obtained by draining reactor water and a method using an underwater laser welding machine (refer to, e.g., Patent Document 1: Japanese Patent No. 4,298,527 and Patent Document 2: Japanese Patent Application Laid-Open Publication No. 2004-209515, the entire contents of which are incorporated herein by reference).

Most breakage events in the measurement pipes 11 described above occur at the welded parts between the measurement pipes 11 and the blocks 12, and there have been proposed only several repair methods that target only the measurement pipes 11 arranged in the vertical direction of the jet pumps 4.

Figure 15:
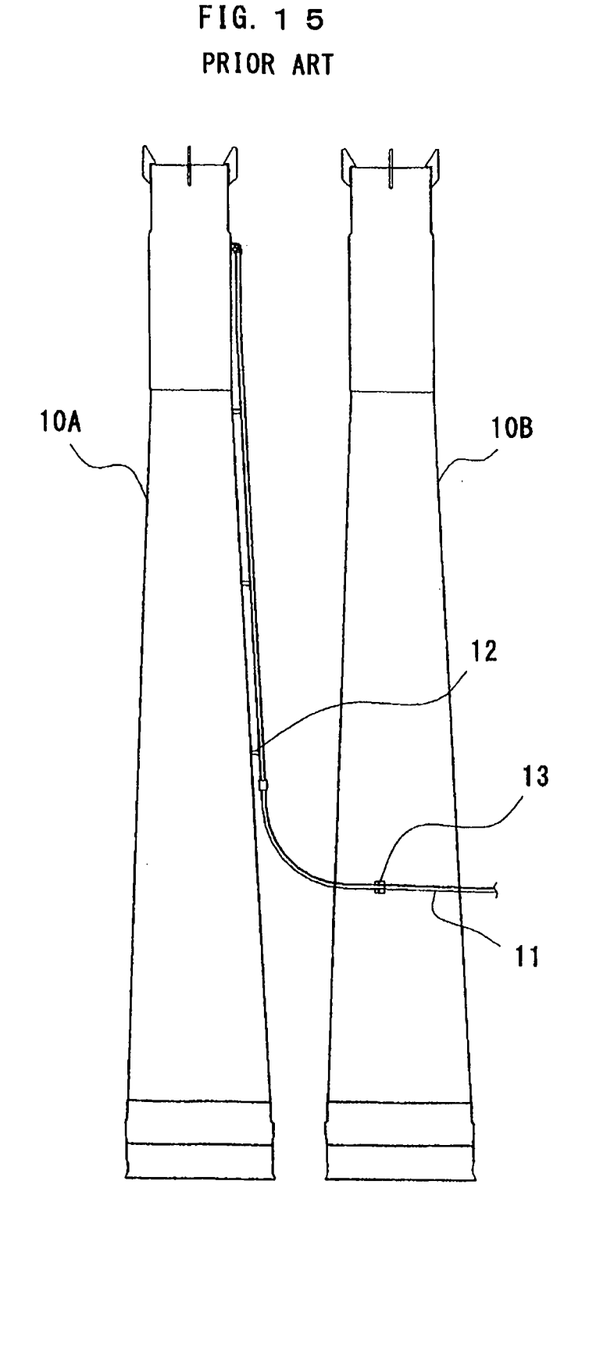
FIG. 15 is an elevated view illustrating a conventional installation state of a jet pump measurement pipe.
Figure 16A:
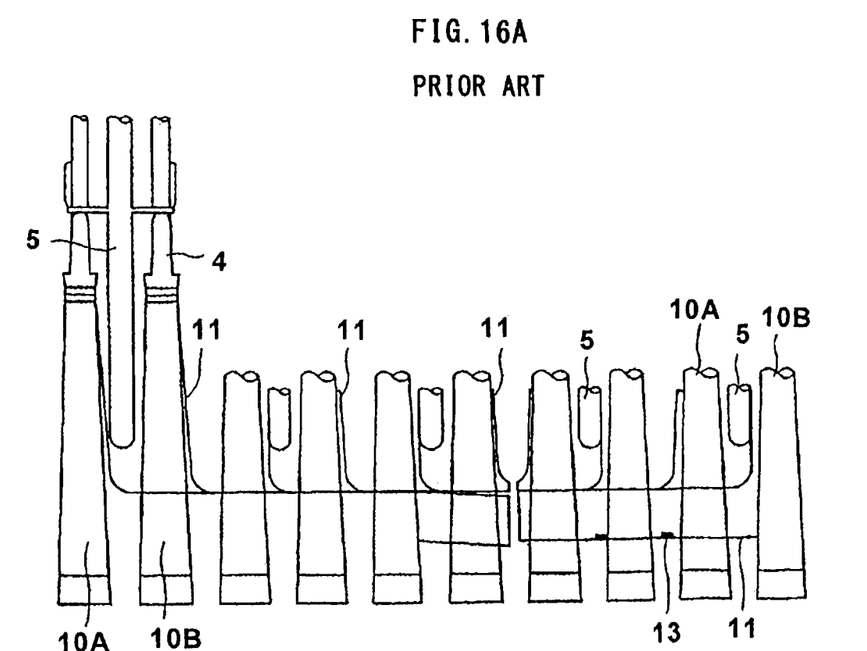
FIGS. 16A and 16B are configuration views illustrating a conventional jet pump measurement pipe.
Figure 16B:
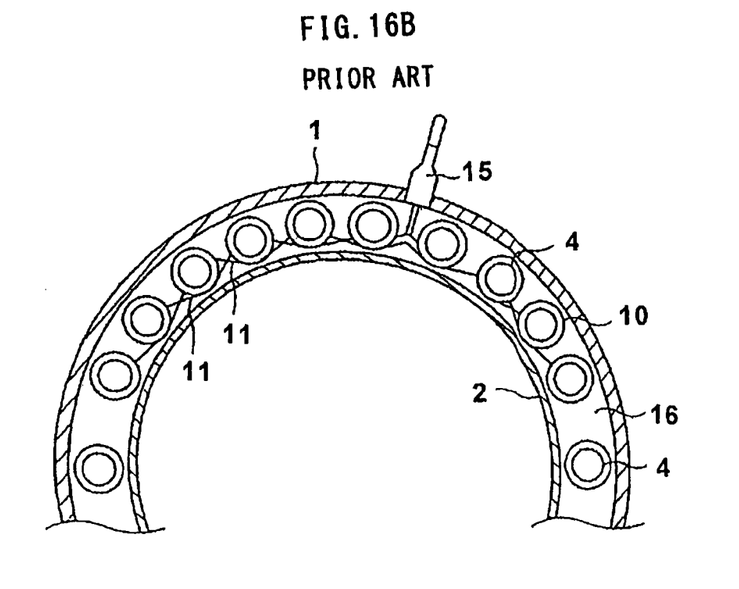

Further, as illustrated in FIGS. 14 and 15, the installation position of the horizontally extending part of the measurement pipes 11 are so narrow that it is difficult to carry out the repair work for this part with the approaches disclosed in Patent Documents 1 and 2.

Furthermore, underwater remote repair work is essential for the horizontally extending part of the measurement pipes 11 due to difficulty in the repair work for positional reasons as described above and further due to the requirement of shortening of the repair process time. Thus, establishment of a repair method that is carried out remotely and underwater has been required for the breakage of the horizontally extending part of the measurement pipes 11.

The present invention has been made in view of the above situation, and an object thereof is to provide a jet pump measurement pipe repair method capable of coping with a_ breakage event occurring at the lower part of a jet pump at which a measurement pipe extends in the horizontal direction underwater.

BRIEF DESCRIPTION OF THE DRAWINGS

The features and advantages of the present invention will become apparent from the discussion hereinbelow of specific, illustrative embodiments thereof presented in conjunction with the accompanying drawings, in which.

DETAILED DESCRIPTION

According to one embodiment, a jet pump measurement pipe repair method repairs a breakage part of a measurement pipe horizontally fixed to a lower part of a jet pump provided in reactor water in a reactor pressure vessel. The method includes a cutting/removing step of cutting and removing the measurement pipe including the breakage part; a retaining step of retaining a connection pipe for connecting a remaining measurement pipe on the jet pump by means of a clamp; and a connecting step of connecting ends of the remaining measurement pipe by means of the connection pipe.

Embodiments of a jet pump measurement pipe repair method according to the present invention will be described below with reference to the accompanying drawings.

In the following embodiments, the same reference numerals are given to the same parts as those in FIGS. 13 to 16. Further, in the following embodiments, a case where a breakage has occurred in the measurement pipe 11 which is horizontally fixed to the diffuser 10 of the jet pump 4 provided in the reactor water in the vertically installed reactor pressure vessel 1 and repair is applied to the breakage part will be described.

First Embodiment

Figure 1:
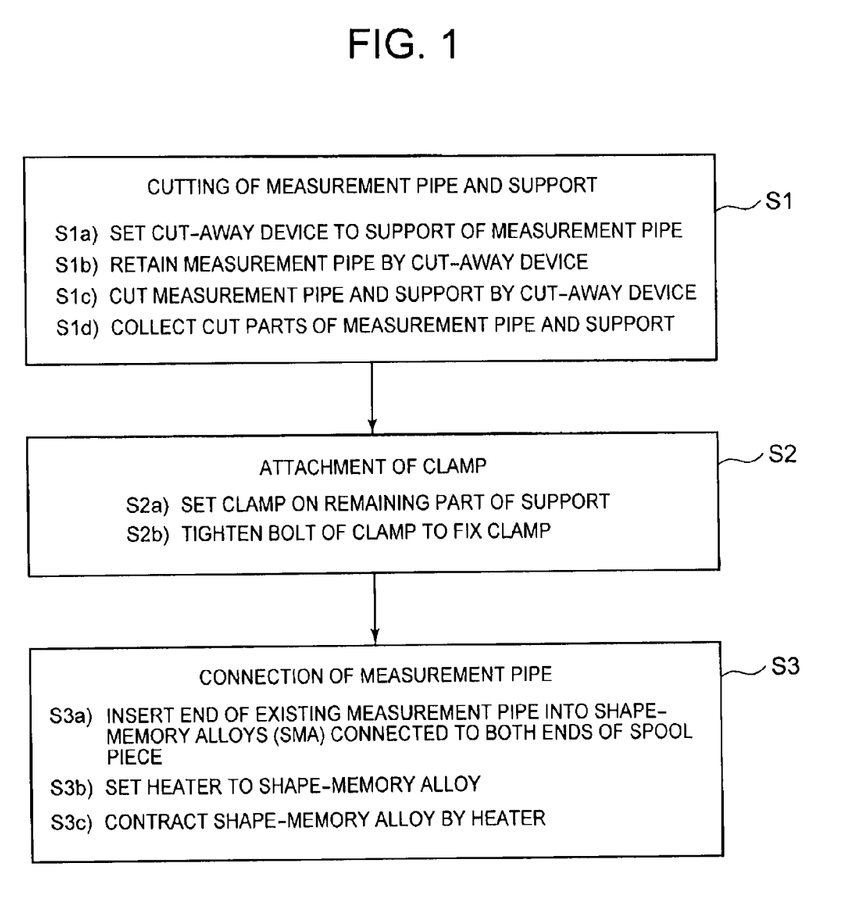
FIG. 1 is a flowchart illustrating a first embodiment of the jet pump measurement pipe repair method according to the present invention.

FIG. 1 is a flowchart illustrating a first embodiment of the jet pump measurement pipe repair method according to the present invention. This flowchart is a repair process flowchart applied upon occurrence of a breakage of the horizontal part of the measurement pipe 11.

As illustrated in FIG. 1, the repair method according to the present embodiment roughly includes step S1 of cutting off and removing the measurement pipe 11 and the support 13, step S2 of attaching a clamp, and step S3 of connecting the measurement pipe 11.

Next, a cut-away device used in step S1 will be described.

Figure 2:
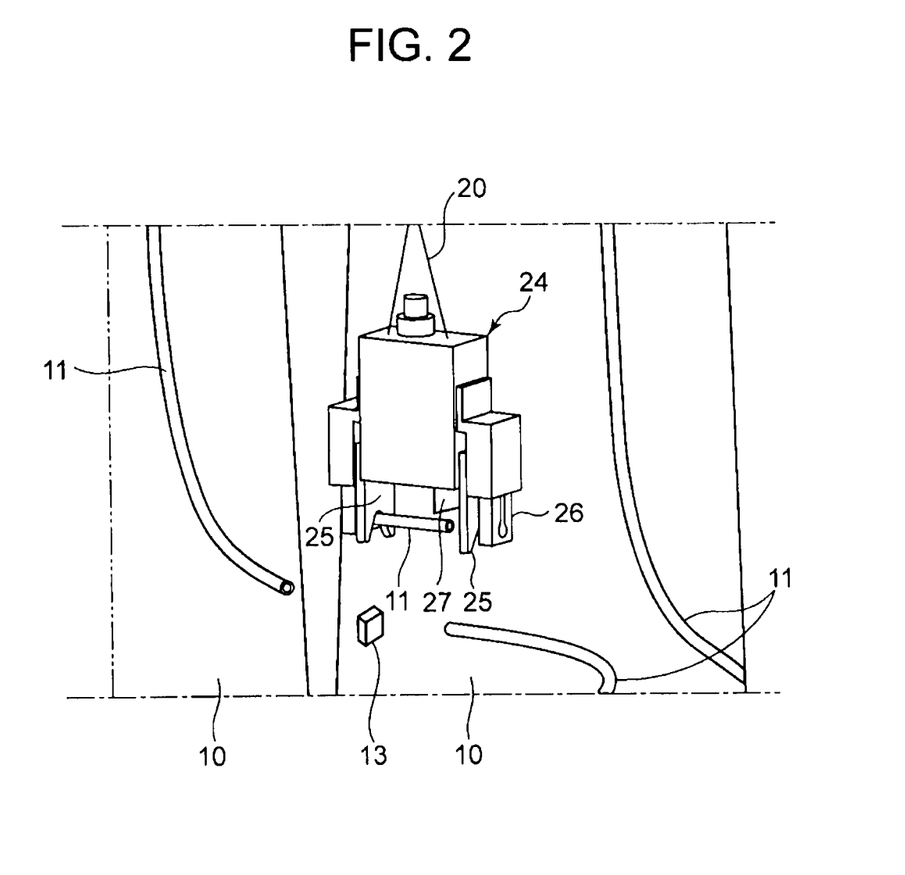
FIG. 2 is a perspective view schematically illustrating a cut-away device used in the first embodiment and a measurement pipe whose horizontal part has been broken.
Figure 3A:
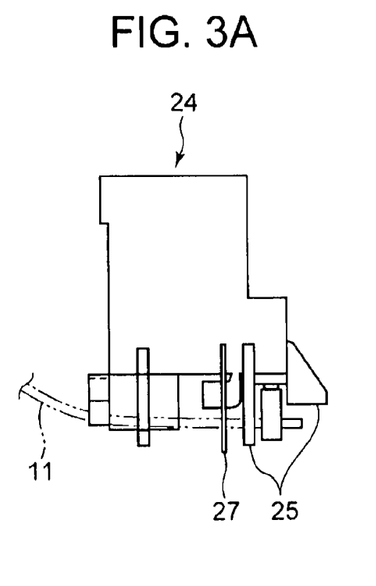
FIG. 3A is a side view illustrating the pipe breakage part side of a cut-away device used in the first embodiment.
Figure 3B:
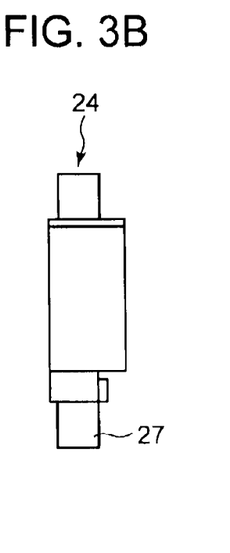
FIG. 3B is a front view of a cutting section of the cut-away device used in the first embodiment.
Figure 3C:
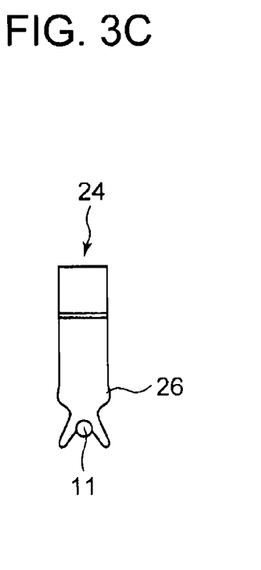
FIG. 3C is a front view of a gripping tool of the cut-away device used in the first embodiment.
Figure 4A:
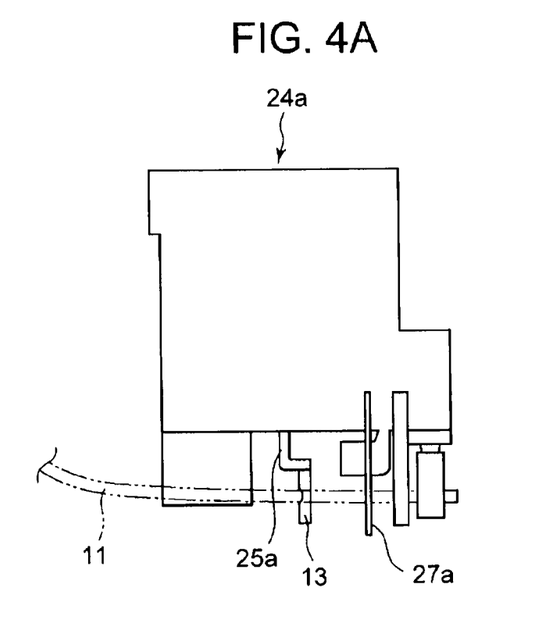
FIG. 4A is a side view of another cut-away device used in the first embodiment as viewed from the opposite side of the pipe breakage part.
Figure 4B:
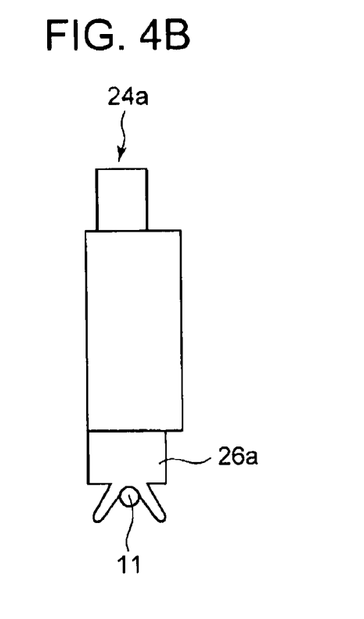
FIG. 4B is a front view of another gripping tool of the another cut-away device used in the first embodiment as viewed from the opposite side of the pipe breakage part.
Figure 5A:
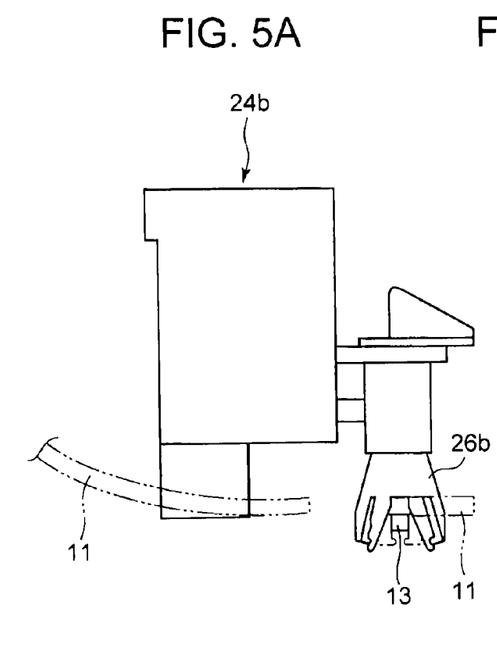
FIG. 5A is a front view of a cut-away device for support cut-off used in the first embodiment.
Figures 5B, 5C:
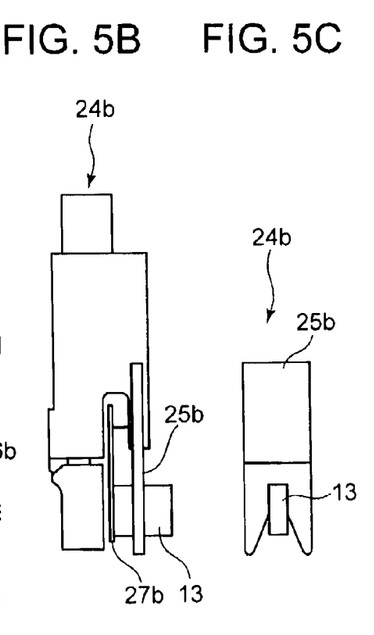
FIG. 5B is a front view of a cutting section of the cut-away device for support cut-off used in the first embodiment.
FIG. 5C is a front view of a guide of the cut-away device for support cut-off used in the first embodiment.

FIG. 2 is a perspective view schematically illustrating a cut-away device used in the first embodiment and the measurement pipe whose horizontal part has been broken. FIG. 3A is a side view illustrating the pipe breakage part side of a cut-away device used in the first embodiment. FIG. 3B is a front view of a cutting section of the cut-away device used in the first embodiment. FIG. 3C is a front view of a gripping tool of the cut-away device used in the first embodiment. FIG. 4A is a side view of another cut-away device used in the first embodiment as viewed from the opposite side of the pipe breakage part. FIG. 4B is a front view of another gripping tool of the another cut-away device used in the first embodiment as viewed from the opposite side of the pipe breakage part. FIG. 5A is a front view of a cut-away device for support cut-off used in the first embodiment. FIG. 5B is a front view of a cutting section of the cut-away device for support cut-off used in the first embodiment. FIG. 5C is a front view of a guide of the cut-away device for support cut-off used in the first embodiment. Note that the cut-away devices illustrated in FIGS. 2 and 3 are assumed to be the same although the outer shapes thereof slightly differ from each other on the drawings.

As illustrated in FIGS. 2, 3A, 3B, and 3C, a cut-away device 24 has a guide section 25 for guiding the broken measurement pipe 11 to be cut, a gripping tool 26 for gripping the measurement pipe 11 guided by the guide part 25, and a cutting section 27 for cutting the measurement pipe 11 near the portion gripped by the gripping tool 26.

The cut-away device 24 is further provided with a hoisting tool 20 capable of moving up and down in the reactor. The hoisting tool 20 is used to move the cut-away device 24 to the breakage part of the measurement pipe 11 with the surrounding around the cut-away device 24 checked with a remote camera, etc. The cut-away device 24 has a thickness of as small as 100 mm or less, making it easy for the cut-away device to move down to the breakage part of the measurement pipe 11, and enabling the cutting work in a narrow portion between the shroud 2 and the diffuser 10.

Similarly, as illustrated in FIGS. 4A and 4B, another cut-away device 24a has a guide section 25a for guiding the measurement pipe 11, a gripping tool 26a for gripping the measurement pipe 11 guided by the guide part 25a, and a cutting section 27a for cutting the measurement pipe 11 near the portion gripped by the gripping tool 26a.

Further, as illustrated in FIGS. 5A, 5B, and 5C, a cut-away device 24b for cutting the support 13 has a guide section 25b for guiding the support 13, a gripping tool 26b for gripping the support 13 guided by the guide part 25b, and a cutting section 27b for cutting the support 13 near the portion gripped by the gripping tool 26b.

That is, the present embodiment has two types of cut-away devices 24 and 24a (FIGS. 3 and 4) for cutting away the measurement pipe 11 and has one cut-away device 24b (FIG. 5) for cutting away the support 13. These cut-away devices 24, 24a, and 24b have the guide sections 25, 25a, and 25b having different shapes from one another and gripping tools 26, 26a, and 26b each formed into a scissor-like shape so as to grip the measurement pipe 11 or the support 13. The use of these cut-away devices 24, 24a, and 24b allows cutting operation to be performed at an accurate position in a stable posture with respect to the measurement pipe 11 or the support 13.

Now, the detailed operation of step S1 of cutting the measurement pipe 11 and the support 13 will be described.

In step S1a, the cut-away devices 24 or 24b illustrated in FIGS. 2, 5A, 5B, and 5C is set to the support 13 of the measurement pipe 11. Subsequently, in step S1b, the gripping tools 26 or 26b is used to grip the measurement pipe 11 and the support 13. Further, in step S1c, the measurement pipe 11 and the support 13 are cut by the cutting sections 27 or 27b of the cut-away devices 24 or 24b. After that, the cut parts of the measurement pipe 11 and the support 13 are collected.

As described above, in step S1, the cut-away devices 24 or 24b is set to the support 13, the gripping tools 26 or 26b of the cut-away device 24 or 24b is used to grip the measurement pipe 11 and the support 13, respectively, and the measurement pipe 11 and the support 13 are cut respectively by the cutting sections 27 or 27b, followed by collection of the cut parts of the measurement pipe 11 and the support 13.

That is, after cutting the measurement pipe 11 and the support 13 around the breakage part, the cut-away device 24 or 24b collects the cut samples (measurement pipe 11 and the support 13) while gripping them by the gripping tools 26 or 26b. The gripping tools 26 or 26b, which are normally driven by the air supply, are each provided with an elasticity imparting member such as a spring as an auxiliary function. Thus, even if the air supply is interrupted, the gripping tools can grip the cut samples by the elastic force of the spring for collection without dropping them in the reactor.

The cutting section 27 included in the cut-away device 24 may adopt electro-discharge machining or mechanical machining as the cutting method. After the measurement pipe 11 and the support 13 have been cut away by the cut-away device 24 or 24b, a spool piece 28 is used to supplement the cut off part. The spool piece 28 can be deformed so as to match the shape of the breakage part to be repaired of the measurement pipe 11. Further, although the spool piece 28 of the present embodiment may have a similar shape to the measurement pipe 11, it may have a different shape. That is, it is only necessary for the spool piece 28 to have a tubular shape capable of supplementing the cut off part of the measurement pipe 11.

Next, the detailed operation of step S2 of attaching a clamp will be described.

Figure 6:
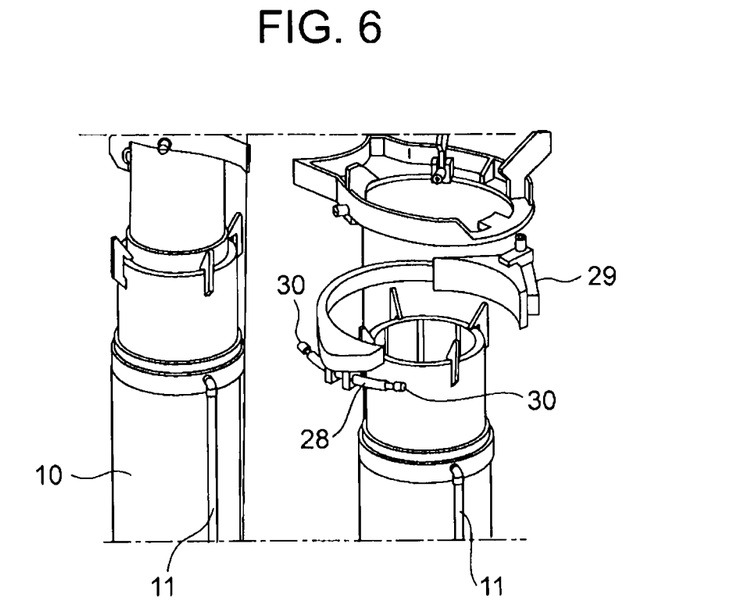
FIG. 6 is a perspective view illustrating a state before attachment of a clamp used in the first embodiment.
Figure 7:
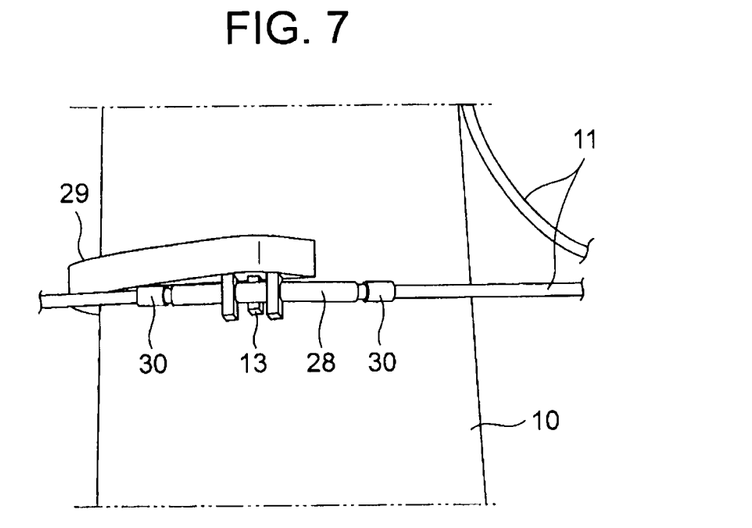
FIG. 7 is an enlarged perspective view illustrating a state where a clamp used in the first embodiment has been attached.

FIG. 6 is a perspective view illustrating a state before attachment of a clamp used in the first embodiment. FIG. 7 is an enlarged perspective view illustrating a state where a clamp used in the first embodiment has been attached.

In step S2a, a clamp 29 retaining the spool piece 28, to both ends of which connection pipes 30 each made of a shape-memory alloy (SMA) are respectively connected, is set to the remaining part of the support 13 using a not-illustrated hoisting tool, as illustrated in FIG. 6. Subsequently, in step S2b, a bolt (not illustrated) of the clamp 29 is tightened to fix the clamp 29 to the remaining part of the support 13, as illustrated in FIG. 7.

That is, in step S2, the clamp 29 is set on the support 13 of the diffuser 10 of the jet pump 4 and is then fixed to the same. The spool piece 28 is hoisted up to the breakage part of the measurement pipe 11 while being retained by the clamp 29 as illustrated in FIGS. 6 and 7. The target position of the spool piece 28 in height direction and in circumferential direction is calculated utilizing the remaining part of the support 13.

Thus, the spool piece 28 is retained to the clamp 29 capable of securely retaining the spool piece 28, and this spool piece 28 is supplemented to the cut off part of the measurement pipe 11. The connection pipes 30 each made of a shape-memory alloy having characteristics that, when it is heated and reaches a certain temperature, the shape thereof is restored to its original shape are connected respectively to both ends of the spool piece 28, as illustrated in FIG. 6.

As described above, step S2 is a retaining step of using the clamp 29 to retain the connection pipes 30 for connecting the cut off ends of the measurement pipe 11 on the jet pump 4.

Next, the detailed operation of step S3 of connecting the cut off ends of the measurement pipe 11 will be described.

Figure 8:
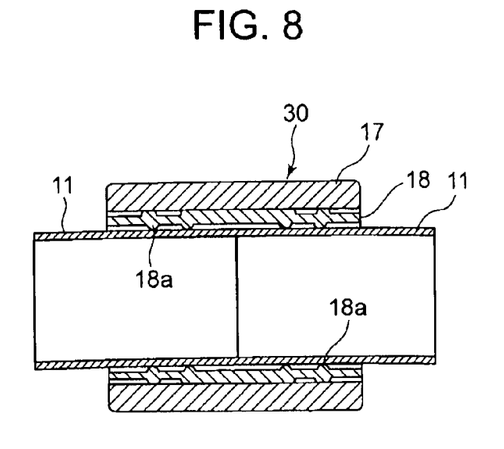
FIG. 8 is a cross-sectional view of a connection pipe made of a shape-memory alloy used in the first embodiment.
Figure 9A:
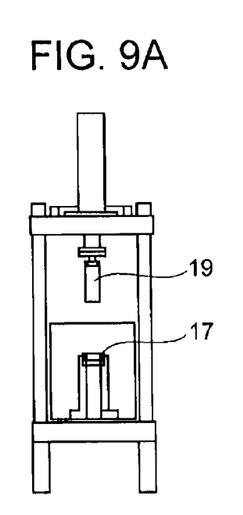
FIG. 9A is a process views illustrating the expanding order of a driver in the shape-memory alloy connection pipe of FIG. 7.
Figure 9B:
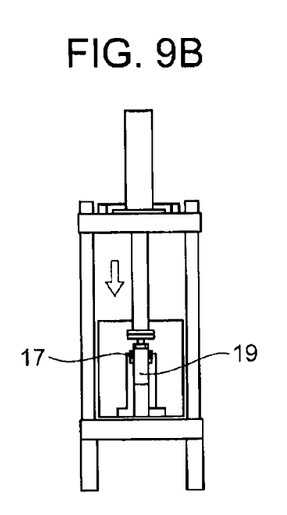
FIG. 9B is a process views illustrating the expanding order of a driver in the shape-memory alloy connection pipe of FIG. 7, showing a state following the state shown FIG. 9A.
Figure 9C:
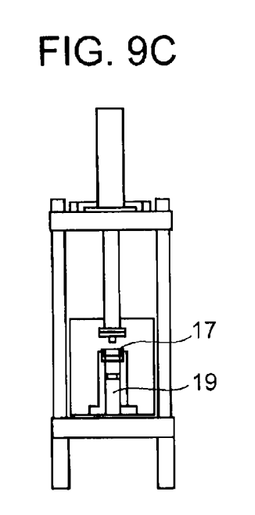
FIG. 9C is a process views illustrating the expanding order of a driver in the shape-memory alloy connection pipe of FIG. 7, showing a state following the state shown FIG. 9B.
Figure 10:
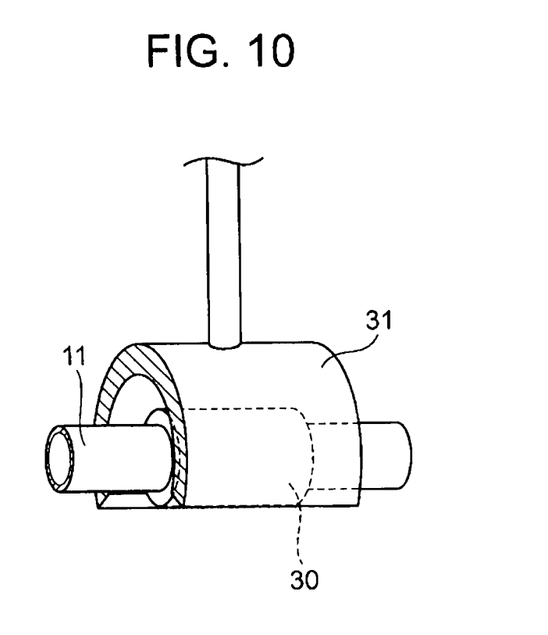
FIG. 10 is a perspective view illustrating a heater for heating the shape-memory alloy connection pipe of FIG. 7.

FIG. 8 is a cross-sectional view of the connection pipe made of a shape-memory alloy used in the first embodiment. FIGS. 9A, 9B, and 9C are process views illustrating the expanding order of a driver in the shape-memory alloy connection pipe of FIG. 8. FIG. 10 is a perspective view illustrating a heater for heating the shape-memory alloy connection pipe of FIG. 8.

The connection pipes 30 each made of a shape-memory alloy having characteristics that, when it is heated and reaches a certain temperature, the shape thereof is restored to its original shape are connected to both ends of the spool piece 28, and the end of the cut existing measurement pipe 11 is inserted into the end of each connection pipe 30 for connection (step S3a).

As illustrated in FIG. 8, the shape-memory alloy connection pipe 30 has a driver 17 and a liner 18 fitted to the inner circumferential surface of the driver 17. As advance preparation, the shape-memory alloy connection pipe 30 is cooled with coolant such as liquid nitrogen or dry ice to a temperature range where the driver 17 is deformable.

Then, as illustrated in FIGS. 9A and 9B, in a state where the driver 17 has been cooled, a rod member 19 having a tapered lower part is inserted into the driver 17 while a predetermined load is applied to expand the inner diameter of the driver 17 to a size capable of accommodating the liner 18 having a plurality of claw portions 18a in the inner circumference thereof (refer to FIG. 9C). The inner diameter of the liner 18 is set to a size allowing easy insertion of the measurement pipe 11. Finally, the liner 18 is inserted into the expanded driver 17.

Then, the end of the broken measurement pipe 11 is inserted into the each of thus prepared shape-memory alloy connection pipes 30 from both ends of the drivers 17 using a remote control gripping tool or the like.

Subsequently, in step S3b, a heater 31 for uniformly heating the outer surface of the shape-memory alloy connection pipe 30 is installed in the reactor as illustrated in FIG. 9 upon completion of the insertion of the end of the broken measurement pipe 11, and the heater 31 is used to heat the driver 17 until the size of the driver 17 is restored to the size before the expansion.

As illustrated in FIG. 10, the heater 31 is formed into a shape obtained by cutting a pipe in its axial direction and can thus uniformly heat the shape-memory alloy 30 to be heated by utilizing the radiation and convection of heat from a heating source. This heater 31 is easy to remove, so that it can be used in a narrow portion in the reactor.

The driver 17 heated by the heater 31 is contracted to compress the liner 18 in the driver 17. As a result, the claw portions 18a formed in the inner circumference of the liner 18 bite into the measurement pipe 11, thereby increasing the connection strength with the measurement pipe 11 and enhancing sealing property (step S3c).

As described above, according to the present embodiment, upon occurrence of a breakage of the measurement pipe 11 which is horizontally arranged at the lower part of the jet pump 4 provided in the reactor water in the reactor pressure vessel 1, the breakage part of the measurement pipe 11 is cut and removed, and then the ends of the cut measurement pipe 11 are connected to each other by the shape-memory alloys 30 with the spool piece 28 interposed between the shape-memory alloys 30. Thus, this method can cope with a breakage event occurring in a narrow portion of the lower part where the measurement pipe 11 is horizontally arranged in the water, improving workability of the connection work for connecting the ends of the cut portion, which enables a reduction in the work periods for repair.

Further, according to the present embodiment, the samples cut by the cutting devices 24 and 24b are collected in a state where they are retained by the gripping tools 26 and 26b, allowing the causes of the breakage to be investigated from the breakage surface of each sample.

In the present embodiment, after the breakage part of the measurement pipe 11 is cut, the ends of the cut measurement pipe 11 are connected by the shape-memory alloys 30 with the spool piece 28 interposed between the shape-memory alloys 30. Alternatively, the ends of the cut measurement pipe 11 may be connected directly by one shape-memory alloy 30 without intervention of the spool piece 28.

Second Embodiment

Figure 11A:
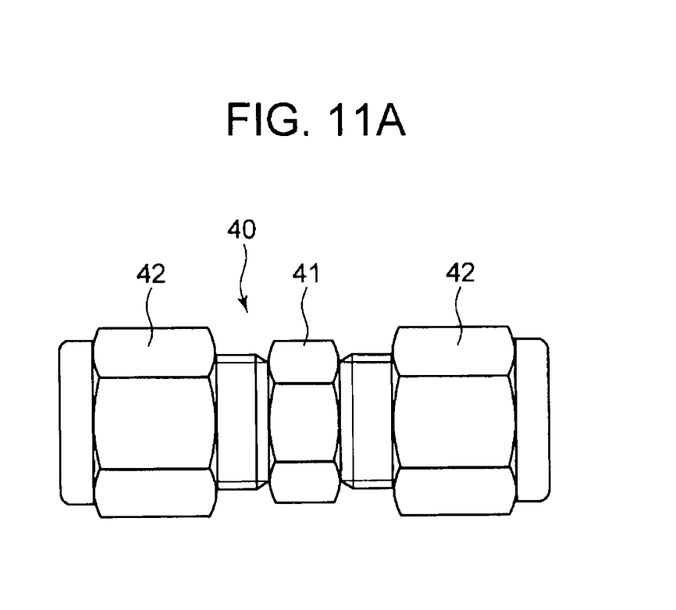
FIG. 11A is a front view illustrating the connection pipe of a biting joint used in a second embodiment.
Figure 11B:
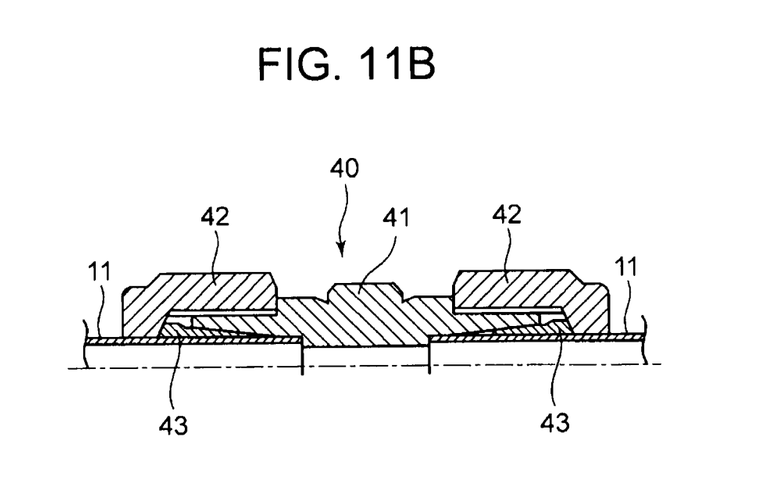
FIG. 11B is a partially cross-sectional view illustrating the connection pipe of the biting joint used in the second embodiment.

FIGS. 11A and 11B are a front view and a partially cross-sectional view illustrating the connection pipe of a biting joint used in a second embodiment.

In the present embodiment, the connection pipe used in step S3 of FIG. 1 is not the shape-memory alloy (SMA) connection portion 30 as described in the first embodiment, but a biting joint 40 as illustrated in FIGS. 10A and 10B. Components other than the connection pipe are the same as those of the first embodiment.

As illustrated in FIGS. 11A and 11B, the biting joint 40 is constituted by three parts: a joint body 41, a union nut 42; and a sleeve 43.

First, when one end of the broken measurement pipe 11 is inserted into one insertion port of the biting joint 40 followed by tightening the union nut 42, a cutting edge of the sleeve 43 bites into the measurement pipe 11 to retain the measurement pipe 11 and seal between the sleeve 43 and measurement pipe 11. The outer circumferential surface of the sleeve 43 is press-bonded to the tapered surface of the joint body 41 to seal between the sleeve 43 and joint body 41.

Further, the other end of the broken measurement pipe 11 is inserted into the other insertion port of the biting joint 40 followed by tightening the union nut 42, thereby establishing connection of the broken measurement pipe 11. The tightening of the union nut 42 can be achieved by using a small remote ratchet wrench, allowing the union nut 42 to be tightened in a narrow portion in the reactor.

As described above, according to the present embodiment, use of the biting joint 40 as the connection pipe allows a robust repair method having a short preparation time and a short repair time to be provided as in the case of the first embodiment.

Although one end and the other end of the broken measurement pipe 11 are directly connected to each other by the biting joint 40 in the present embodiment, the ends of the broken measurement pipe 11 may be connected by using the biting joints 40 respectively with the spool piece 28 interposed between the biting joints 40.

Third Embodiment

Figure 12:
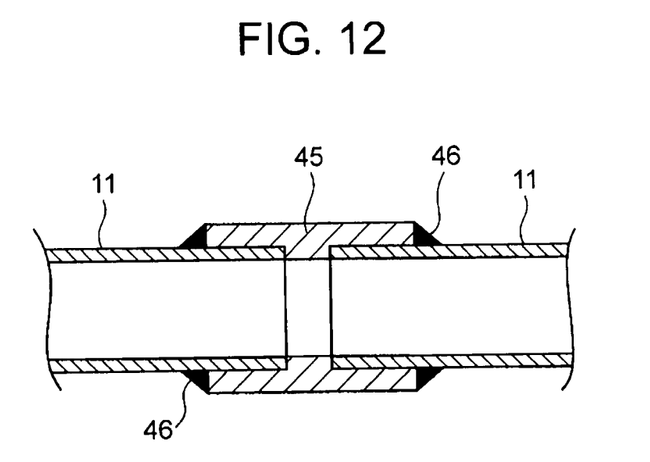
FIG. 12 is an enlarged cross-sectional view illustrating the connection pipe of fillet welding used in a third embodiment.

FIG. 12 is an enlarged cross-sectional view illustrating the connection pipe of fillet welding used in a third embodiment.

In the present embodiment, one end and the other end of the measurement pipe 11 whose horizontal part has been broken are welded through a joint 45 for connection.

The welding work of welding one end and the other end of the measurement pipe 11 through the joint 45 will be described.

As illustrated in FIG. 12, the joint 45 made of the same material as that of the measurement pipe 11 is introduced inside the reactor using a remote control gripping tool. Subsequently, one end of the broken measurement pipe 11 is inserted into the joint 45 followed by fillet welding in the circumferential direction of the measurement pipe 11 to thereby form a fillet-welded portion 46.

After the completion of the connection between one ends of the joint 45 and pipe 11, the other end of the measurement pipe 11 is inserted into the joint 45 followed by the welding to thereby achieve the connection of the measurement pipe 11. At this time, the welding is performed by means of, e.g., underwater laser welding capable of performing welding of the horizontally extending part of the measurement pipe 11.

As described above, the repair work of the present embodiment requires only bringing down an underwater laser welding machine, allowing the repair work to be performed in a narrow space.

Although one end and the other end of the broken measurement pipe 11 is directly welded by using the joint 45 in the present embodiment, the ends of the broken measurement pipe 11 are welded with the joints 45 with the spool piece 28 interposed between the joints 45.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A jet pump measurement pipe repair method for repairing a breakage part of a measurement pipe which is horizontally fixed to a lower part of a jet pump provided in reactor water in a reactor pressure vessel, the method comprising:
cutting the measurement pipe including the breakage part;
cutting a support member supporting the measurement pipe to a diffuser of the jet pump;
removing part of the measurement pipe and part of the support member;
fixing, by a clamp, a spool piece having a tubular shape directly to part of the support member remaining after the removing, both ends of the spool piece being connected to connection pipes, for supplementing the measurement pipe having been cut and removed;
deforming the spool piece having the tubular shape to match a shape of the breakage part; and
connecting ends of the remaining measurement pipe to the connection pipes.

2. The jet pump measurement pipe repair method according to claim 1, wherein
the connection pipe used in the connecting is made of shape-memory alloy.

3. The jet pump measurement pipe repair method according to claim 1, wherein
the connection pipe used in the connecting is a biting joint including a joint body, union nuts, and sleeves.

4. The jet pump measurement pipe repair method according to claim 1, wherein
in the connecting, the ends of the remaining measurement pipe and the connection pipes are connected by welding.

\* \* \* \* \*